(12) United States Patent
Gao et al.

(10) Patent No.: US 12,302,130 B2
(45) Date of Patent: May 13, 2025

(54) SYSTEM AND METHOD FOR PROVIDING CONFIGURATION INFORMATION

(71) Applicant: ZTE CORPORATION, Guangdong (CN)

(72) Inventors: Yuan Gao, Shenzhen (CN); He Huang, Shenzhen (CN); Xiaojuan Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 338 days.

(21) Appl. No.: 17/591,753

(22) Filed: Feb. 3, 2022

(65) Prior Publication Data
US 2022/0159481 A1 May 19, 2022

Related U.S. Application Data

(63) Continuation of application No. PCT/CN2019/099738, filed on Aug. 8, 2019.

(51) Int. Cl.
*H04W 24/02* (2009.01)

(52) U.S. Cl.
CPC .................. *H04W 24/02* (2013.01)

(58) Field of Classification Search
CPC ..... H04W 24/02; H04W 48/02; H04W 48/12; H04W 36/0085; H04W 28/18
See application file for complete search history.

(56) References Cited

U.S. PATENT DOCUMENTS

| | | | |
|---|---|---|---|
| 2006/0040645 A1* | 2/2006 | Grilli | H04W 8/245 |
| | | | 455/412.1 |
| 2006/0229102 A1 | 10/2006 | Kitazoe et al. | |
| 2011/0096723 A1 | 4/2011 | Aoyama et al. | |
| 2016/0278149 A1* | 9/2016 | Uchino | H04W 76/14 |
| 2016/0373967 A1* | 12/2016 | Eklöf | H04W 8/22 |
| 2018/0227812 A1* | 8/2018 | Nagasaka | H04W 24/10 |
| 2019/0166527 A1* | 5/2019 | Oketani | H04W 36/085 |
| 2020/0313838 A1* | 10/2020 | Jin | H04W 48/12 |
| 2022/0217597 A1* | 7/2022 | Ishii | H04W 36/0058 |

FOREIGN PATENT DOCUMENTS

| CN | 103188803 A | 7/2013 |
|---|---|---|
| CN | 109699088 A | 4/2019 |

OTHER PUBLICATIONS

3GPP TSG RAN WG2 #88; R2-144891; Source: Ericsson; Title: Re-usable Configurations in RRC Signaling; San Francisco, US, Nov. 17-21, 2014 (Year: 2014).*
3GPP TSG-RAN WG2 #88; R2-144935; Source: Huawei, HiSilicon; Title: Configuration reuse for RRC state transition; San Francisco, USA, Nov. 17-21, 2014. (Year: 2014).*

(Continued)

*Primary Examiner* — Mohammed S Chowdhury
(74) *Attorney, Agent, or Firm* — Foley & Lardner LLP

(57) ABSTRACT

A system and method for providing information are disclosed herein. In one embodiment, the method includes configuring, by a first wireless communication node, a list indicating a plurality of default configurations. The plurality of default configurations is associated with respective indices. The method includes providing, by the first wireless communication node to a wireless communication device, a first one of the indices.

19 Claims, 11 Drawing Sheets

(56) References Cited

OTHER PUBLICATIONS

3GPP TSG-RAN2 Meeting #43; R2-042410; Source: Qualcomm Europe; Title: Default configurations in Rel-6; Prague, Czech Republic, Aug. 16-20, 2004; (Year: 2004).*
3GPP TSG RAN WG1 #97; R1-1906872; Source: ZTE; Title: Discussion on the TA and PRACH for the NTN; Reno, USA, May 13-17, 2019 (Year: 2019).*
Extended European Search Report on EP 19940853.5 dated Jun. 14, 2022 (8 pages).
International Search Report and Written Opinion for PCT Appl. No. PCT/CN2019/099738 mailed Apr. 29, 2020 (8 pages).

* cited by examiner

SYSTEM AND METHOD FOR PROVIDING CONFIGURATION INFORMATION

CROSS-REFERENCE TO RELATED APPLICATION

This application claims the benefit of priority under 35 U.S.C. § 120 as a continuation of PCT Patent Application No. PCT/CN2019/099738, filed on Aug. 8, 2019, the disclosure of which is incorporated herein by reference in its entirety.

TECHNICAL FIELD

The disclosure relates generally to wireless communications and, more particularly, to systems and methods for providing configuration information.

BACKGROUND

In a non-terrestrial network (NTN), user equipment (UE) interacts with a satellite directly to exchange uplink and downlink signaling and data. In some embodiments, an NTN specific configuration and a terrestrial network (TN) configuration which can be reused in the NTN are provided to the UE.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes configuring, by a first wireless communication node, a list indicating a plurality of default configurations. The plurality of default configurations is associated with respective indices. The method includes providing, by the first wireless communication node to a wireless communication device, a first one of the indices.

In some embodiments, the method includes receiving, by the first wireless communication node from the wireless communication device, a first message indicating that either one of the plurality of default configurations associated with a second one of the indices has been successfully acquired by the wireless communication device, or whether the default configuration associated with the second index is supported by the wireless communication device and transmitting, by the first wireless communication node responsive to receiving the first message, a second message indicating the first index to the wireless communication device. Any number of default configurations, associated with respective indices, which have been successfully acquired or supported by the communication device can be indicated from the communication device to the communication node in the first message.

In another embodiment, a method performed by a wireless communication device includes receiving, by a wireless communication device from a wireless communication node, a first one of a plurality of indices. Each of the plurality of indices is associated with a respective one of a plurality of default configurations configured in a list. The method includes configuring, based on the first index, an operation of the wireless communication device.

In yet another embodiment, an apparatus includes receiving, by a wireless communication device from a first wireless communication node, a configuration in relation to the first wireless communication node and performing, based on the received configuration, an operation of the wireless communication device.

In some embodiments, the wireless communication device receives the configuration in an RRC connected state and the method further includes performing, by the wireless communication device based on the configuration, a handover to a cell and transmitting, by the wireless communication device, a message to the first wireless communication node indicating that the handover has been performed.

In yet another embodiment, an apparatus includes determining, by a first wireless communication node, a configuration in relation to the first wireless communication node and transmitting, by the first wireless communication node, the configuration to a wireless communication device.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
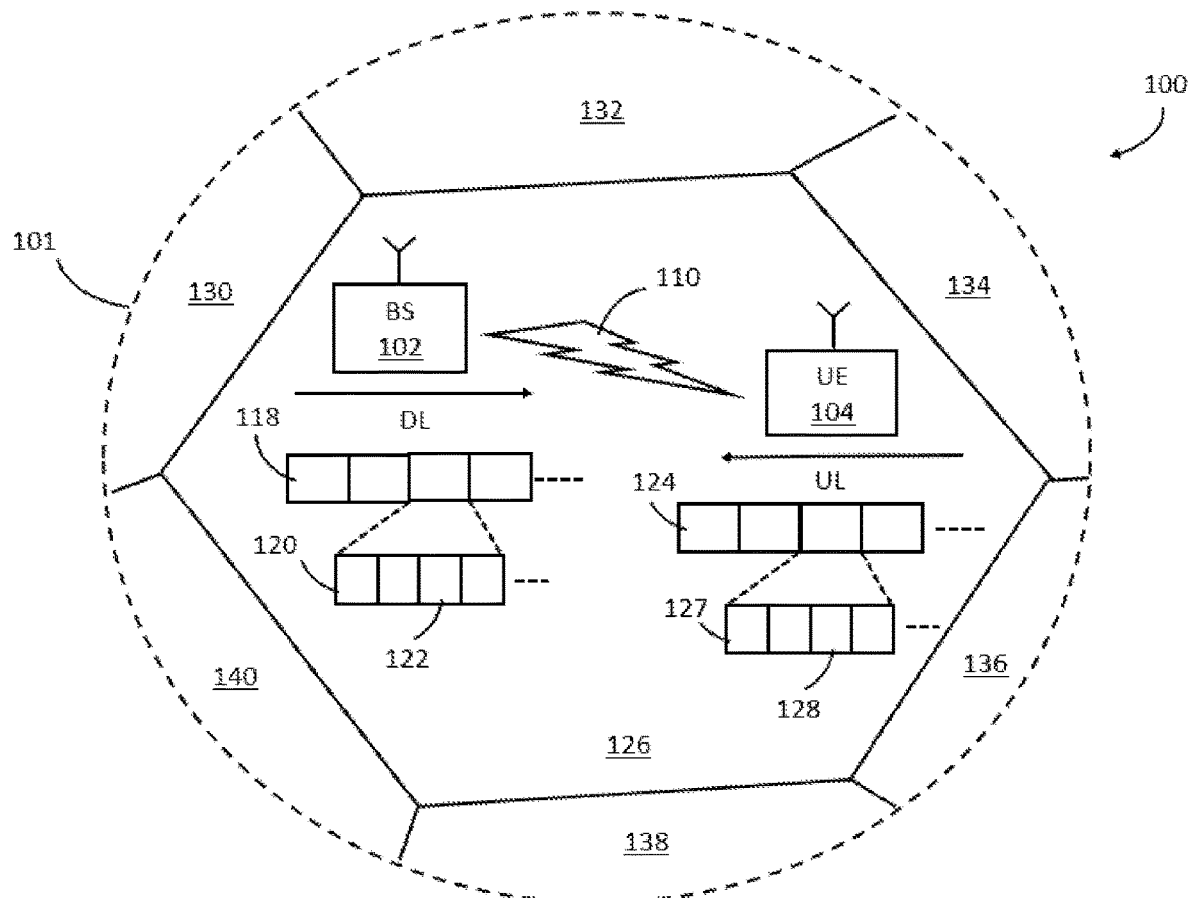
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
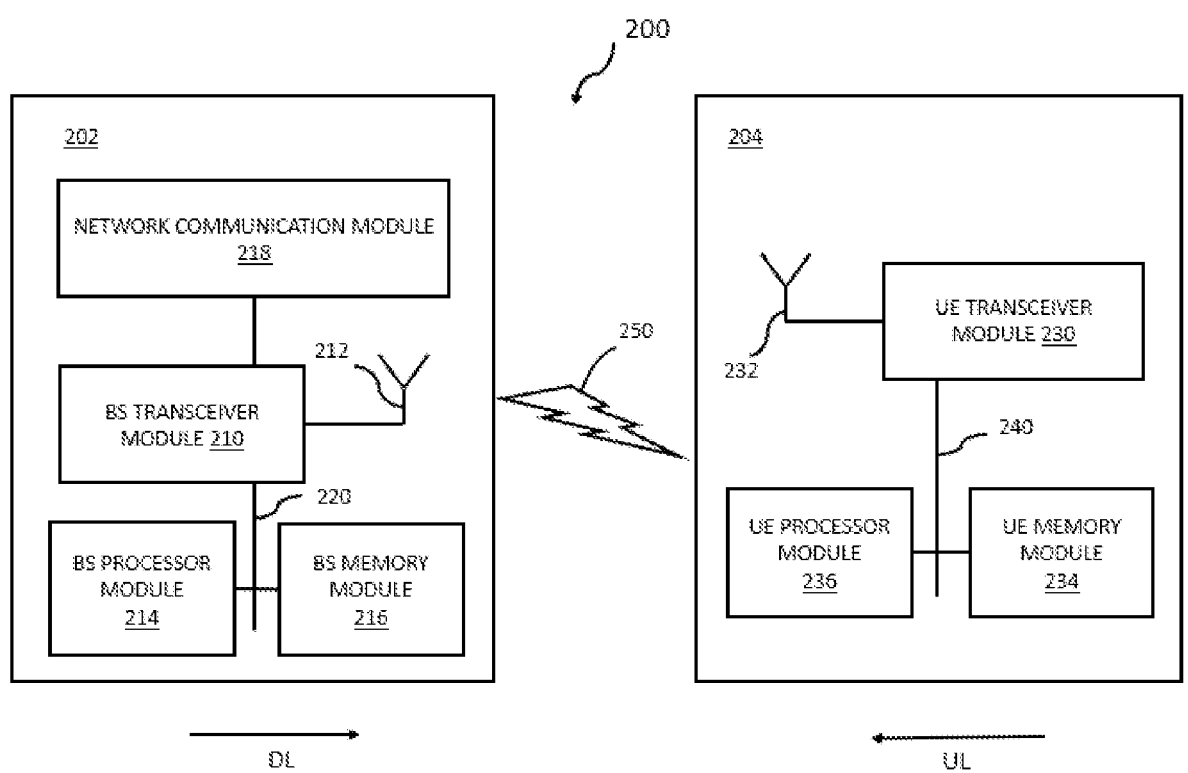
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, gNB, ng-eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic.

In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Examples of Providing Configuration Information

In the non-terrestrial network (NTN), a UE (e.g. the UE 104, the UE 204, a wireless communication device, a mobile device, etc.) interacts with satellite directly to exchange uplink and downlink signaling and date. The BS (e.g. the BS 102, the BS 202, a wireless communication node, a gNB, a gNodeB, a network, etc.) that configures the UE to communicate in the NTN network can either be the satellite, a terrestrial BS, or a combination thereof. In a transparent satellite based NextGen RAN (NG-RAN) architecture, the satellite is coupled (e.g. via an NTN gateway) to a terrestrial BS. In one embodiment of a regenerative satellite based NG-RAN, the satellite is a non-terrestrial BS and is coupled directly to the 5G core network (CN). In one embodiment of the regenerative satellite based NG-RAN, the satellite is one of multiple gNB distributed units (gNB-DUs) that is coupled to a terrestrial gNB centralized unit (gNB-CU). Some NTN specific configuration, as well as some terrestrial network (TN) configuration which can be reused in the NTN, can be provided to the UE.

There exists a technical problem. That is, embodiments not contemplated by the disclosure configure the UE using an undesired (e.g. greater than a predetermined threshold) number of transmissions and/or bits, resulting in additional latency, reduced throughput, and/or additional power consumption, as compared to embodiments in which the number of transmissions and/or bits is desired (e.g. less than the predetermined threshold).

Some embodiments of a system and method to provide configuration information from an NTN-based or TN-based radio access network (RAN) node to the UE in RRC_IDLE, RRC_INACTIVE or RRC_CONNECTED mode are described herein. In some embodiments, the UE receives an index from the network and applies a corresponding default configuration identified by the received index. In some embodiments, the UE receives a configuration from the network and determines: (a) one or more cells and/or one or more frequencies to perform measurements on; (b) a target cell to move to based on the configuration; and/or (c) cells to be included in a measurement report. Some of the embodiments include a technical solution to the technical problem. That is, some of the embodiments configure the UE using the desired number of transmissions and/or, resulting in lower latency, increased throughput, and/or lower power consumption, as compared to the embodiments not contemplated by the disclosure.

In some embodiments, a NW (network e.g. the satellite or the terrestrial BS) configures a list, mapping, or other data structure indicating default configurations. The data structure maps the default configurations to, or otherwise associates them with, respective indices. The NW can transmit directly, transmit via a source BS, or otherwise provide, to the UE, a first one of the indices. The UE can apply the corresponding default configuration based on the received first index. Prior to transmitting the first index to the UE, the NW can predefine and/or transmit the list to the UE.

In some embodiments, a default configuration identifier (ID) and a detailed configuration can be provided and the detailed configuration can be used to provide a delta configuration based on the default configuration index. In some embodiments, measurement information provided in system information can be reused by the network and/or the UE, e.g. by referring the measurement object to the inter-frequency measurement configuration in a system information block (SIB). In some embodiments, one default configuration is pre-configured or specified in specifications. In some embodiments, if a dedicated configuration is absent, the (e.g. pre-configured) default configuration is used.

The list of default configurations can be provided from the NW to the UE via system information or dedicated radio resource control (RRC) signaling. For example, index 1 identifies the first default configuration in the default configuration list, index 2 identifies the second default configuration in the default configuration list, and so on. The list of default configuration can also be defined in the specifications.

The default configuration (e.g. list) can include one or more default radio link control (RLC) configurations, one or more default medium access control (MAC) configurations, one or more default physical layer (PHY) configurations, one or more default service data application protocol (SDAP) configurations, one or more default packet data convergence protocol (PDCP) configurations, one or more default measurement configurations, one or more default data radio bearer (DRB) configurations, one or more default signaling radio bearer (SRB) configurations, one or more default cell group configurations, one or more default logical channel configurations, one or more default configurations for the reference signal, and/or one or more default configurations for a physical channel. The default configuration list can include a list of default random access channel (RACH) configurations. In some embodiments, each default RACH configuration in the list contains multiple per beam RACH configurations. The per beam RACH configuration may be referred to as a RACH configuration associated with each of a number of beams (e.g., quasi-co-location (QCL) states, transmission configuration indicator (TCI) states, spatial relations states, etc.). The number of the per beam RACH configuration in each default configuration is larger than or equal to the number of the beams.

The NW can determine whether a default configuration is applicable to the UE. In some embodiments, the UE reports, to the NW via dedicated RRC signaling, an index of a default configuration in the list which has been successfully acquired or is supported by the UE. One or more of such default configurations can be successfully acquired or be supported, and the UE can report one or more indices corresponding to the respective one or more configurations. The dedicated RRC signaling can include an RRCSetupComplete message, an RRCResumeComplete message, an RRCReestablishmentComplete message or a UECapabilityInformation message. The NW take the UE report, network policy, traffic load, and/or radio signal quality into consideration to determine an appropriate default configuration and provide an index to UE via dedicated RRC signaling, e.g., an RRCReconfiguration message.

The NW can transmit, configure, or otherwise provide the default configuration to the UE in several ways. In some embodiments, a choice structure is used to distinguish the use of a default configuration (e.g. index) and a normal (e.g. detailed) configuration. The NW can choose to provide only one option: either a first index of the configuration or the detailed configuration. In some embodiments, the only one option may be selected and configured to the UE via dedicated RRC signaling (e.g. the RRCReconfiguration message). In some embodiments, the detailed configuration is a configuration that the NW is configuring the UE to, without use of an index and/or list.

In some embodiments, the NW determines and provides a combination of the default configuration index and a delta configuration to the UE. In some embodiments, the NW determines a delta configuration. In some embodiments, the delta configuration includes a difference between the detailed configuration and a default configuration associated with the default configuration ID. For example, the default configuration is MAC1, RLC2, and PHY3, and the detailed configuration (e.g. the configuration that the NW is configuring the UE to) is MAC1, RLC2, and PHY4. As such, the PHY4 is the delta configuration, which replaces PHY3 in the default configuration. In some embodiments, the NW transmits, configures, or otherwise provides the default configuration ID and the delta configuration to the UE. In some embodiments, the delta configuration to the UE delta configuration is provided, e.g. by the NW, through the information elements (IEs) for the detailed configuration.

If the default configuration ID and the detailed configuration is included in the RRC signaling, in some embodiments, the UE applies the default configuration and ignores the detailed configuration. In some embodiments, the UE applies the default configuration first, and applies the detailed configuration IE second, causing the delta configuration to be enabled.

Figure 3:
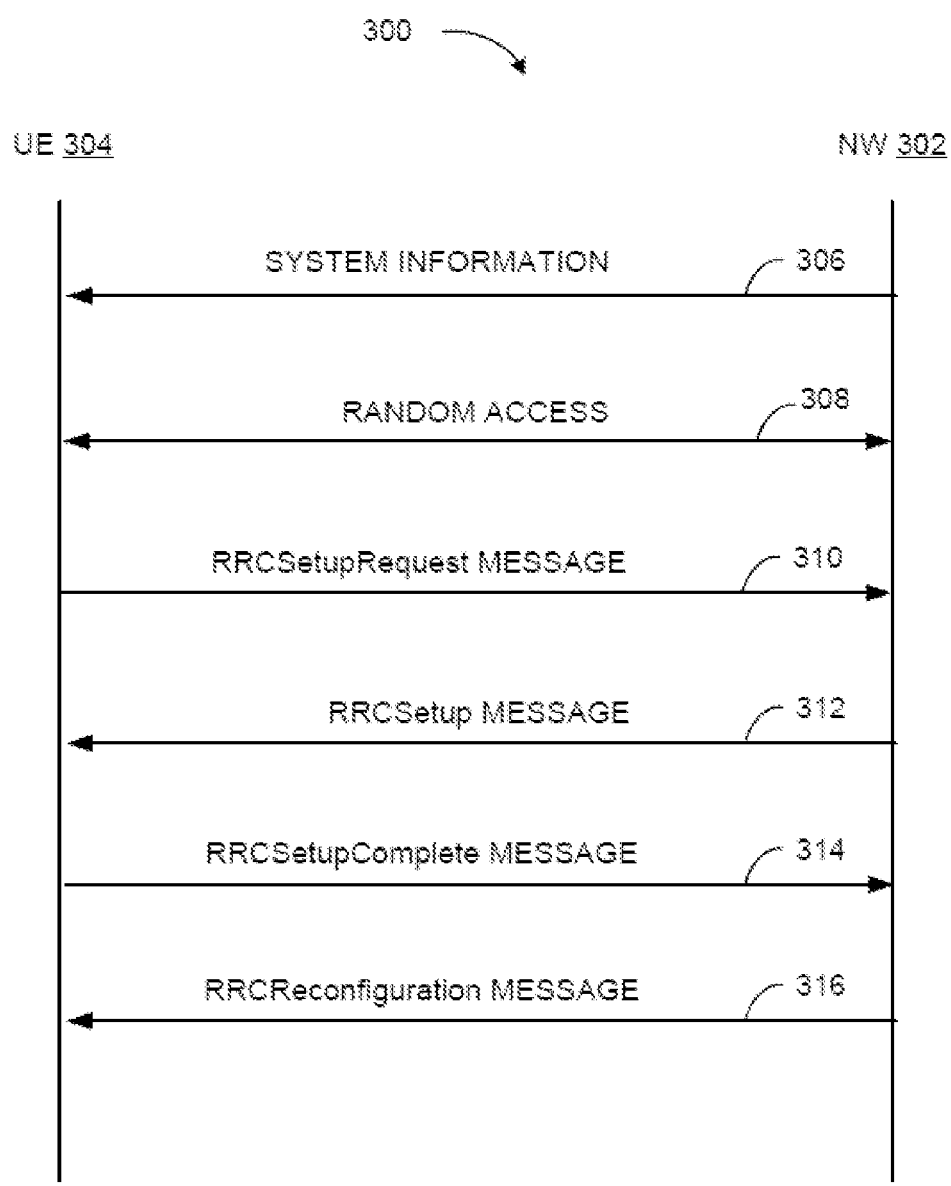
FIG. 3 illustrates a sequence diagram for index based signaling, in accordance with some embodiments of the present disclosure.

FIG. 3 illustrates a sequence diagram 300 for index based signaling, in accordance with some embodiments of the present disclosure. As shown in FIG. 3, a list of default configurations is broadcast to the UE 304 via system information (e.g. in the system information 306). The default configuration list includes default of many (e.g. RLC, MAC, PHY, SDAP, PDCP, DRB, SRB, cell group, logical channel, physical channel, reference signal) configurations. Random access 308, e.g. resource selection, preamble transmission, response reception and contention resolution, is setup between the NW 302 and the UE 304.

Next, an RRC connection is established, resumed, or otherwise configured. For example, the UE 304 sends an RRCSetupRequest message 310 to the NW 302, the NW 302 sends an RRCSetup message 312 to the UE 304, and the UE 304 sends an RRCSetupComplete message 314 to the NW 302.

After successful random access 308 is granted and the RRC connection is established, the NW 302 determines a default configuration. The NW 302 may take network policy, traffic load, and some other information into consideration in determining the appropriate default configuration. The NW 302 sends a RRCReconfiguration message 316 to the UE 304. In some embodiments, an index of the determined configuration will then be provided via the RRCReconfiguration message 316. In some embodiments, some part of the determined configuration is different from any default configuration in the list provided to the UE 304. In some embodiments, since the some part of the determined configuration is different, the NW 302 provides the index of a default configuration and a delta configuration to the UE 304 via the RRCReconfiguration message 316.

In some embodiments, a default configuration can be defined or predefined (e.g., in the specifications), and the UE 304 and the NW 302 include, or have access to, the default configuration. In such embodiments, the NW 302 may not transmit a list of default configurations in the system information 306 to the UE 304. In some embodiments, after successful random access and establishment of the RRC connection, no index or detailed configuration is sent to the UE 304 via an RRCReconfiguration message 316. The UE 304 applies the default configuration defined in the specifications.

In some embodiments, a list of measurement configuration for neighbor cells and/or frequencies is broadcast to the UE 304 via the system information. In some embodiments, after successful random access 308 and establishment of the RRC connection, the NW 302 determines a measurement configuration. The NW 302 may take network policy, traffic load, and some other information into consideration in determining the measurement configuration. A measurement object may be specified in the measurement configuration. The UE 304 may measure the measurement object based on the configuration. In some embodiments, the measurement object is linked to the neighbor cell or frequency provided in system information and is transmitted, configured, or otherwise provided to the UE 304 via the RRCReconfiguration message 316.

Figure 4:
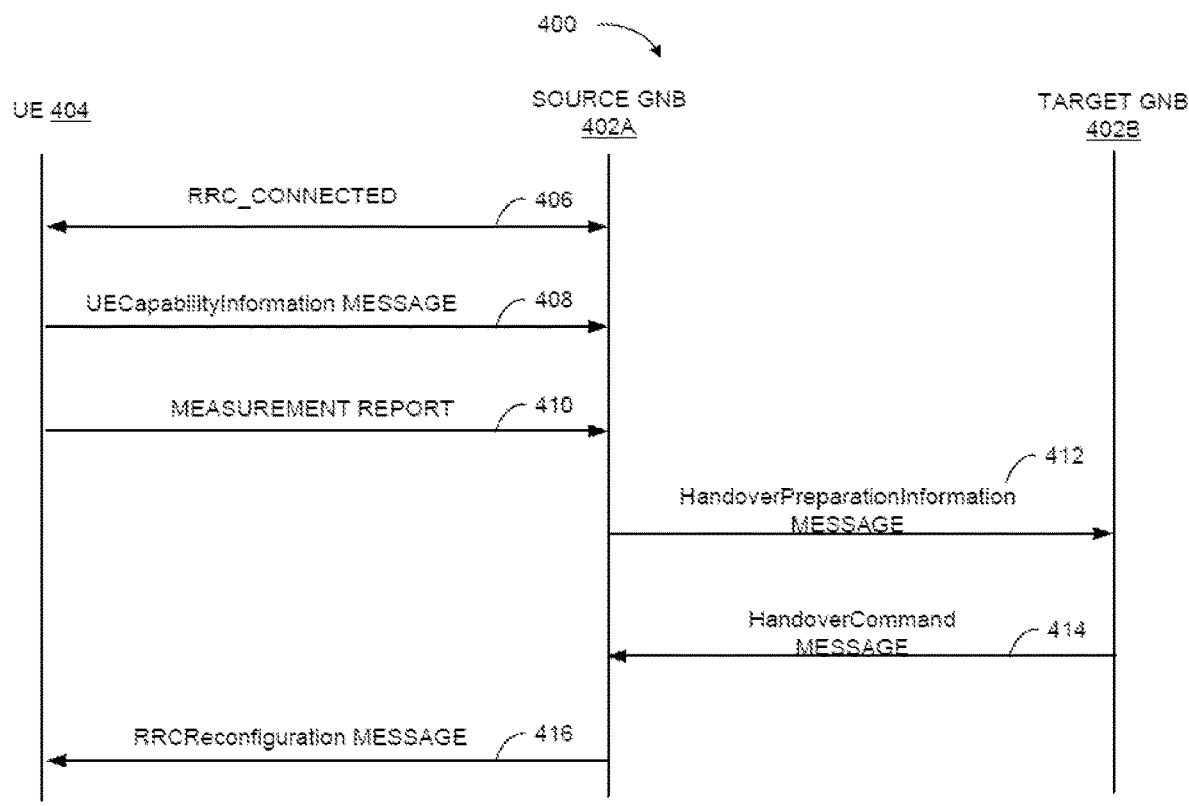
FIG. 4 illustrates a sequence diagram for index based signaling during a handover, in accordance with some embodiments of the present disclosure.

FIG. 4 illustrates a sequence diagram 400 for index based signaling during a handover, in accordance with some embodiments of the present disclosure. As shown in FIG. 4, a list of default configurations is broadcast to a UE 404 (e.g. the UE 104, the UE 204, and/or the UE 304). via system information (e.g. the system information 306 with respect to FIG. 3). The UE 404 enters an RRC_CONNECTED state 406 through RRC setup or RRC resume procedures (e.g. transmission of the RRCSetupRequest message 310 and reception of the RRCSetup message 312 with respect to FIG. 3). After successful random access, the UE 404 reports an index of a default configuration which is supported by the UE 404 (e.g. via the RRCSetupComplete message, the RRCResumeComplete message, the RRCReestablishmentComplete message, or the UECapabilityInformation message 408). In some embodiments, the UE 404 reports one or more indices corresponding to a respective one or more default configurations which are supported by the UE 404.

A source gNB 402A (e.g. a first wireless communication node, the BS 102, the BS 202, and/or the NW 302) receives a measurement report 410 from the UE 404. The measurement report 410 includes measurement results of the neighbor cells or frequencies or measurement objects. The measurement report 410 will be triggered periodically or conditionally. A trigger condition can be that a signal quality of the serving cell (e.g. associated with the source gNB 402A) is smaller than a threshold, e.g., the serving cell not providing qualified radio service to the UE 404. The trigger condition can occur when the UE 404 moves to an edge of the serving cell. An allowed closed access group (CAG) list can be associated with a condition to trigger measurement report.

Upon receiving the measurement report, in some embodiments, the source gNB 402A determines to handover the UE 404 to a target cell associated with a target gNB 402B (e.g. a second wireless communication node, a second instance of the BS 102, the BS 202, or the NW 302). During the handover preparation phase, the source gNB 402A provides one or more default configurations which are supported by the UE 404 and the index of those configurations to the target gNB 402B via a HandoverPreparationInformation message 412. In some embodiments, the target gNB 402B determines a configuration based on the default configurations supported by the UE 404, the network policy, traffic load, and/or some other information. The gNB 402B provides the index of the determined configuration to the source gNB 402A via HandoverCommand message 414. The source gNB 402A will then forward the index to the UE 404 via the RRCReconfiguration message 416.

In some embodiments, the target gNB 402B provides system information from a target cell via the HandoverCommand message 414 (e.g. responsive to the target gNB 402B receiving the HandoverPreparationInformation message 412). In some embodiments, the system information includes a list of default configurations to the source gNB 402A. The source gNB 402A forwards the system information of the target cell to the UE 404 via dedicated RRC signaling (e.g. the RRCReconfiguration message 416). The index of the determined configuration and the system information containing the default configuration list of the target cell can be provided from the target gNB 402B to the source gNB 402A via a same message or different messages in an Xn interface (e.g. an interface between two gNBs) or an NG interface (i.e. an interface between gNB and the core network, target gNB transmits the information to core network and the core network will then forward such information to the source gNB via NG interface). The index of the determined configuration and the system information containing the default configuration list of the target cell can be provided from source gNB 402A to the UE via a same RRC message or different RRC messages.

In some embodiments, a UE (e.g. the UE 104 or the UE 204, a wireless communication device, a mobile device, etc.) receives a configuration in relation to a wireless communication node (e.g. the BS 102, the BS 202, a satellite, a non-terrestrial communication node, a terrestrial communication node, a gNB, a gNodeB, a network, etc.). The UE can perform, based on the received configuration, one or more operations. The operations may include determining one or more cells and/or one or more frequencies to perform measurements on, a target cell to move to based on the configuration, and/or cells to be included in a measurement report. The configuration can include at least one of the ephemeris information of the current satellite and the neighbor satellites, the physical cell identifiers (PCI) of the cells of the current satellite and neighbor satellites, a type of the current cell, one or more neighbor cells, or one or more cells on concerned frequencies. For each of the cells, the type of cell can include whether the cell is a satellites cell, and/or the orbit type of satellite cell, such as a low earth orbit (LEO), a medium earth orbit (MEO), and a geostationary earth orbit (GEO).

The configuration can include at least one of an uplink (UL) power requirement, a (DL) power requirement, and a band number. The at least one of the UL power requirement, DL power requirement, and the band number can be of, or associated with, the current cell (e.g., a first wireless node), the one or more neighbor cells (e.g., a second wireless node), or the one or more cells on concerned frequencies. The UL power requirement can include at least one of the UL received target power, the power class required, or the minimal UL power required. The DL power requirement can include the DL target transmission power (with which a path loss can be calculated). A band number allocated for various satellite types is included in specifications and different band numbers will are for different satellite types. The UE can determine the satellite type based on the received band number.

The configuration can include one indicator to indicate whether the autonomous search shall be applied, one or more Non-Public Network (NPN) IDs (which is used to identify a NPN), Closed Access Group (CAG) IDs (which is used to identify a CAG), and/or Public Land Mobile Network (PLMN) IDs to limit the report of measurement result and/or the event triggering. In some embodiments, cells included in the allowed NPN, CAG, or PLMN list are considered to be included in the measurement report. The allowed NPN, CAG, or PLMN list can be an event to trigger measurement report. Once the UE moves into or out of the cell associated with the allowed list, measurement report will be triggered, in some embodiments. The configuration can be provided from the wireless communication node to the UE via dedicated RRC signaling or system information.

Figure 5:
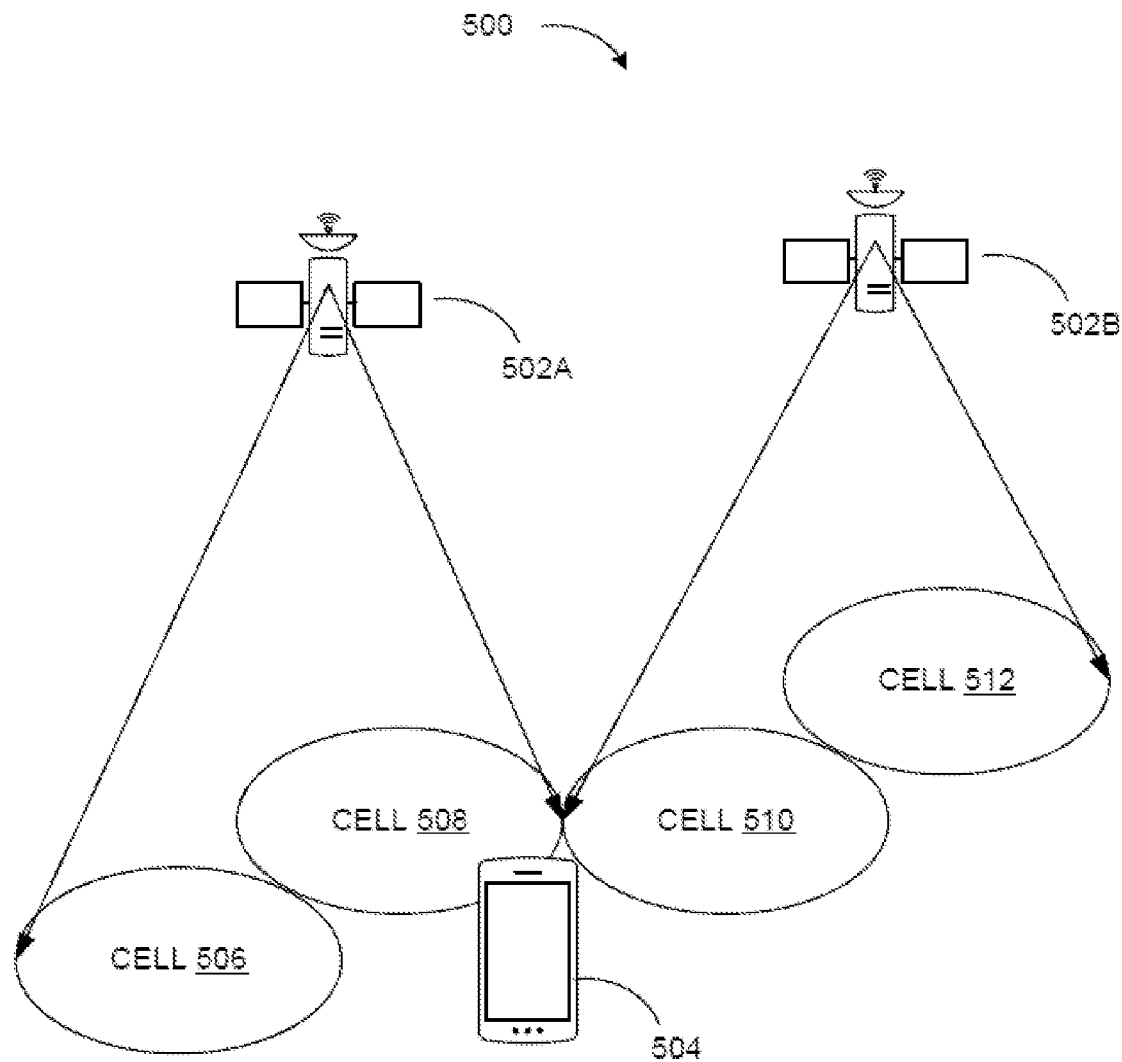
FIG. 5 illustrates a block diagram of an environment for assisting UE mobility, in accordance with some embodiments of the present disclosure.

FIG. 5 illustrates a block diagram of an environment 500 for assisting UE mobility, in accordance with some embodiments of the present disclosure. The environment 500 includes a current satellite 502A (e.g. the BS 102, the BS 202, the NW 302, the source gNB 402A), a neighbor satellite 502B (e.g. the BS 102, the BS 202, the target gNB 402B) and a UE 504 (e.g. the UE 104, the UE 204, the UE 304, the UE 404). The current satellite 502A includes cells 506 and 508, and the neighbor satellite 502B includes neighbor cells 510 and 512. The UE 504 receives a configuration (e.g. ephemeris information of, and the PCI of the cells of, the current satellite 502A and the neighbor satellites 502B) via system information. The UE 504 receives the configuration in either an RRC inactive, an RRC idle state, or an RRC connected state. As shown in FIG. 5, the UE 504 determines a location of the current satellite 502A and the neighbor satellite 502B and the PCI of the cells covered by the current satellite and neighbor satellite. In some embodiments, the UE 504 performs measurements on the neighbor cells 510 and 512. In some embodiments, if receiving the configuration in either the RRC inactive state or the RRC idle state, state the UE 504 performs cell selection and/or reselection to one of the neighbor cells 510 or 512. In some embodiments, if receiving the configuration in the RRC connected state, the UE 504 (a) transmits a measurement report to the current satellite 502A, or (b) performs a handover to one of the neighbor cells 510 or 512 and transmits a measurement report to the current satellite 502A indicating that the handover has been performed.

Figure 6:
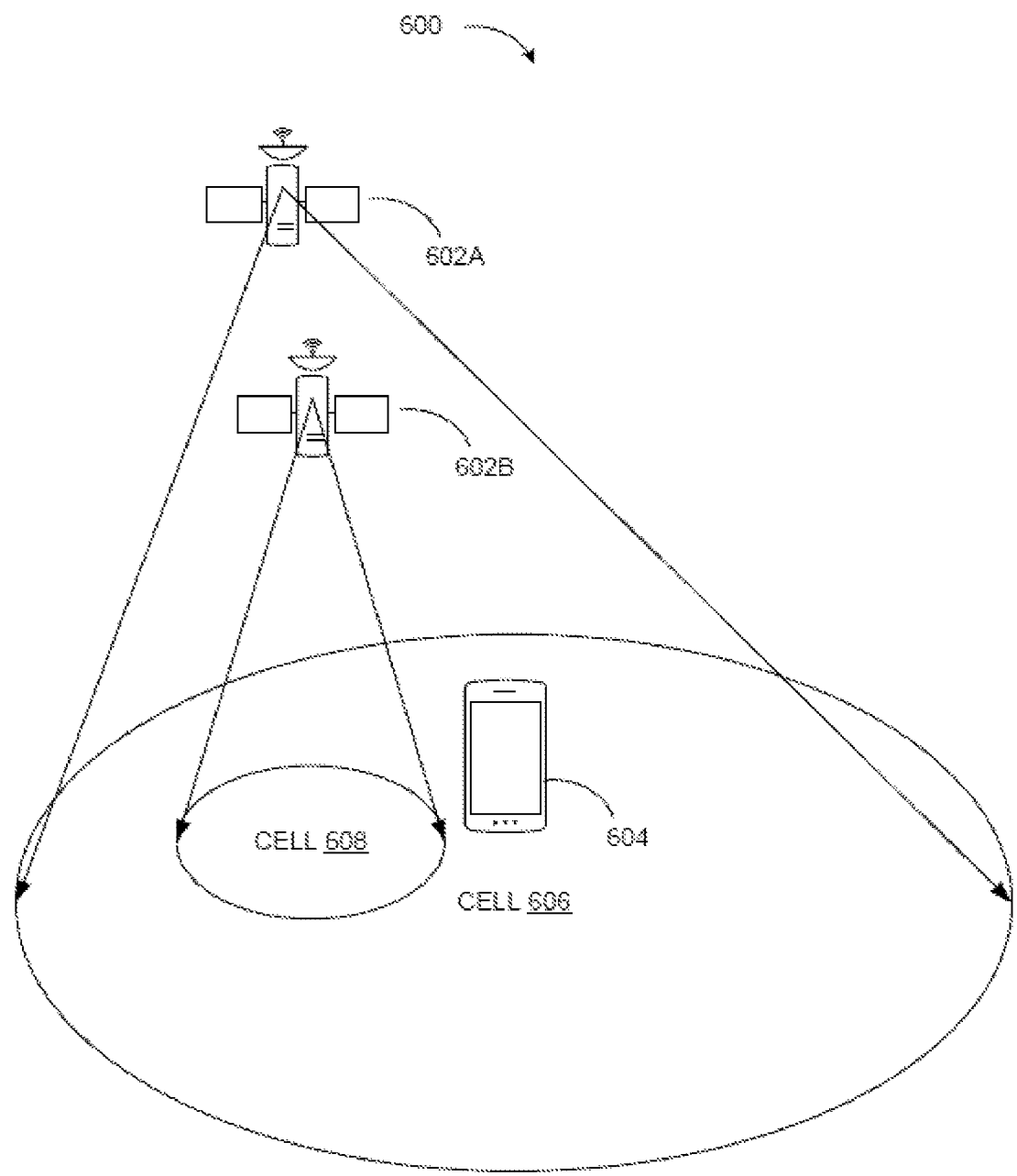
FIG. 6 illustrates a block diagram of an environment for assisting UE mobility, in accordance with some embodiments of the present disclosure.

FIG. 6 illustrates a block diagram of an environment 600 for assisting UE mobility, in accordance with some embodiments of the present disclosure. The environment 600 includes a GEO satellite 602A (e.g. the current satellite 502A), a LEO satellite 602B (e.g. the neighbor satellite 502B) and a UE 604 (e.g. the UE 504). The GEO satellite 602A includes a cell 606, and the LEO satellite 602B includes a neighbor cell 608. The UE 604 receives the satellite type of the GEO satellite 602A and the LEO satellite 602B via system information, in some embodiments. As shown in FIG. 6, the UE 604, with lower transmission power, is not able to get access to the cell 606, which is served by the GEO satellite 602A in high altitude. In some embodiments, the UE 604 performs measurements on the neighbor cell 608 and/or performs a cell reselection (if in the RRC idle state or the RRC inactive state) or a handover (if in the RRC active state) to the neighbor cell 608.

Figure 7:
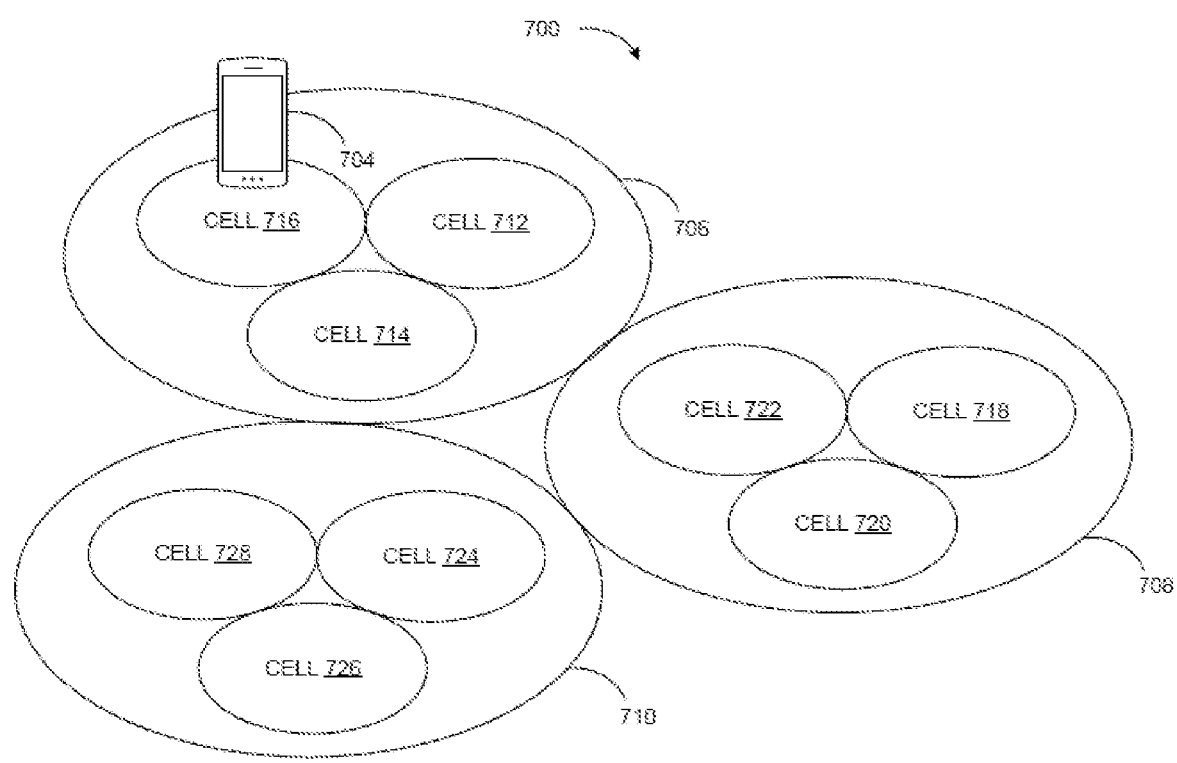
FIG. 7 illustrates a block diagram of an environment for assisting UE mobility, in accordance with some embodiments of the present disclosure.

FIG. 7 illustrates a block diagram of an environment 700 for assisting UE mobility, in accordance with some embodiments of the present disclosure. The environment 700 includes a UE 704 (e.g. the UE 504 or the UE 604), a CAG 706, a CG 708, and a CAG 710. The CAG 706 includes the cells 712, 714, and 716. The CAG 708 includes the cells 718, 720, and 722. The CAG 710 includes the cells 724, 726, and 728. As shown in FIG. 7, the UE 704 camps on cell 716. The UE 704 receives the allowed CAG ID list from the camped cell 716 via system information and determines that UE is allowed to get access into CAG 706 and CAG 708. In some embodiments, the UE selectively performs measurements (e.g. on cells 712, 714, 718, 720, and 722) based on the allowed list. The UE 704 includes the measurement results of those cells (e.g. cells 712, 714, 718, 720, and 722) in the measurement report and transmits the measurement report, in some embodiments.

Figure 8:
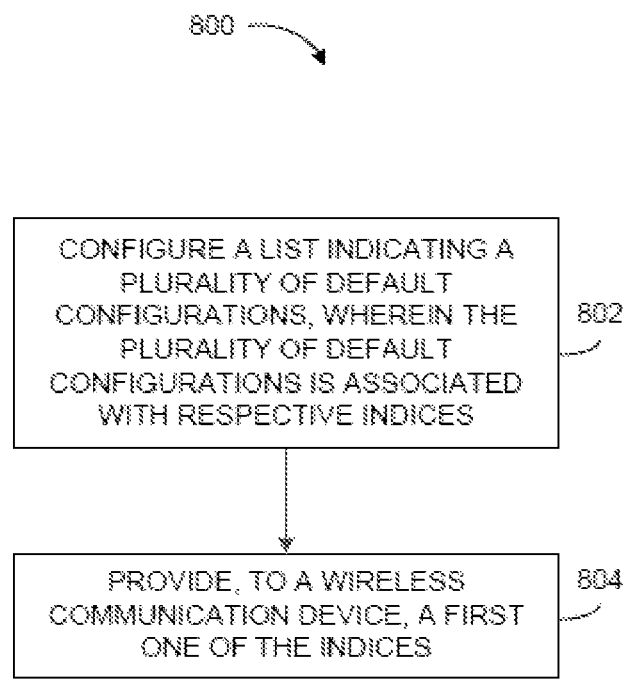
FIG. 8 is a flow diagram illustrating an example process for providing configuration information, in accordance with some embodiments of the present disclosure.

FIG. 8 is a flow diagram illustrating an example process 800 for providing configuration information, in accordance with some embodiments of the present disclosure. In some embodiments, the process 800 can be performed by a wireless communication node (e.g. the BS 102, the BS 202, the NW 302, the source gNB 402A, or the target gNB 402B, among others). Additional, fewer, or different operations may be performed in the process 800 depending on the embodiment. The wireless communication node configures a list indicating a plurality of default configurations (802). The plurality of default configurations is associated with respective indices. The wireless communication node provides, to a wireless communication device (e.g. the UE 104, the UE 204, the UE 304, or the UE 404, among others), a first one of the indices (804).

In some embodiments, the first index is associated with one of the plurality of default configurations indicated in the list. In some embodiments, prior to transmitting the first index to the wireless communication device, the wireless communication device predefines the list to the wireless communication device or transmits, to the wireless communication device, the list.

In some embodiments, the list is transmitted to the wireless communication device via a dedicated radio resource control (RRC) message or system information.

In some embodiments, the plurality of default configurations include at least one of: one or more default radio link control (RLC) configurations; one or more default medium access control (MAC) configurations; one or more default physical layer (PHY) configurations; one or more default service data adaptation protocol (SDAP) configurations; one or more default packet data coverage protocol (PDCP) configurations; one or more default measurement configurations; one or more default data radio bearer (DRB) configurations; one or more default signaling radio bearer (SRB) configurations; one or more default cell group configurations; one or more default logical channel configurations; one or more default configurations for physical channels; one or more default configurations for reference signals; or one or more default random access procedure (RACH) configurations. In some embodiments, each of the one or more default RACH configurations includes a plurality of per beam RACH configurations, each of which is associated with one of a plurality of beams. In some embodiments, a number of the per beam RACH configurations is greater than or equal to a number of the beams.

In some embodiments, the wireless communication node is a first wireless communication node. In some embodiments, the first wireless communication node receives, from the wireless communication device, a first message indicating that either one of the plurality of default configurations associated with a second one of the indices has been successfully acquired by the wireless communication device, or whether the default configuration associated with the second index is supported by the wireless communication device and transmits, responsive to receiving the first message, a second message indicating the first index to the wireless communication device. Any number of default configurations, associated with respective indices, which have been successfully acquired or supported by the communication device can be indicated from the communication device to the communication node in the first message.

In some embodiments, the first message includes at least one of: an RRCSetupComplete message, an RRCResumeComplete message, an RRCResetablishmentComplete message, or a UECapabilityInformation message. In some embodiments, the second message includes an RRCReconfiguration message. In some embodiments, the wireless communication node transmits, to the wireless communication device, a third message indicating the first index that is associated with one of the plurality of default configurations. In some embodiments, the third message includes an RRCReconfiguration message. In some embodiments, the first wireless communication node determines a detailed configuration and transmits, to the wireless communication device, a fourth message indicating a usage difference between the detailed configuration and one of the plurality of default configurations associated with the first index.

In some embodiments, the first wireless communication node transmits, to the wireless communication device, a fifth message indicating the first index and a delta configuration that includes a difference between a detailed configuration and one of the plurality of default configurations associated with the first index. In some embodiments, the fifth message includes an RRCReconfiguration message. In some embodiments, the first wireless communication node receives from the wireless communication device, a sixth message indicating whether one of the plurality of default configurations associated with a second one of the indices is supported by the wireless communication device, transmits, to a second wireless communication node (e.g. the BS 102, the BS 202, the NW 302, the source gNB 402A, or the target gNB 402B, among others) responsive to receiving the sixth message, a seventh message indicating the default configuration associated with the second index, receives, from the second wireless communication node, an eighth message indicating the first index, and transmits to the wireless communication device, a ninth message indicating the first index. Any number of default configurations, associated with respective indices, which have been successfully acquired or supported by the communication device can be indicated from the communication device to the communication node in the first message. In some embodiments, the sixth message includes a UECapabilityInformation message, the seventh message includes a HandoverPreparationInformation message, the eighth message includes a Handover Command message, and the ninth message includes an RRCReconfiguration message.

In some embodiments, the first wireless communication node transmits, responsive to receiving an eleventh message indicating a handover, the list to a second wireless communication node to cause the second wireless communication node to forward the list to the wireless communication device and transmits, responsive to receiving the eleventh message, the first index to the second wireless communication node to cause the second wireless communication node to forward the first index to the wireless communication device via a twelfth message. In some embodiments, the eleventh message includes a HandoverPreparationInformation message and the twelfth message includes an RRCReconfiguration message.

In some embodiments, the first wireless communication node transmits, to the wireless communication device, a thirteenth message indicating one or more measurement objects that are linked to one or more neighboring cells or frequencies provided in system information. In some embodiments, the thirteenth message includes an RRCReconfiguration message.

Figure 9:
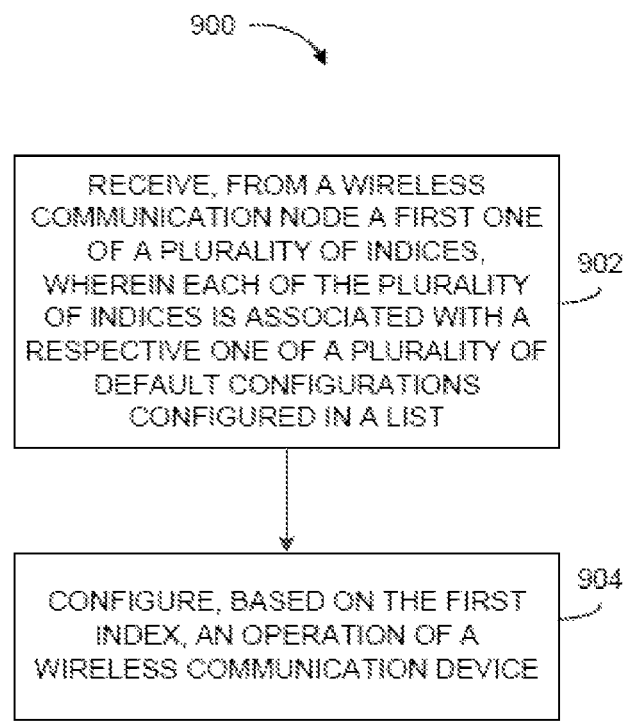
FIG. 9 is a flow diagram illustrating an example process for providing configuration information, in accordance with some embodiments of the present disclosure.

FIG. 9 is a flow diagram illustrating an example process 900 for providing configuration information, in accordance with some embodiments of the present disclosure. In some embodiments, the process 900 can be performed by a wireless communication device (e.g. the UE 104, the UE 204, the UE 304, or the UE 404, among others). Additional, fewer, or different operations may be performed in the process 900 depending on the embodiment. The wireless communication device receives, from a wireless communication node (e.g. the BS 102, the BS 202, the NW 302, the source gNB 402A, or the target gNB 402B, among others), a first one of a plurality of indices (902). Each of the plurality of indices is associated with a respective one of a plurality of default configurations configured in a list. The wireless communication device configures, based on the first index, an operation of the wireless communication device (904). In some embodiments, prior to receiving the first index from the wireless communication node, wireless communication device receives, from the wireless communication node, the list.

In some embodiments, the wireless communication device transmits, to the wireless communication node, a first message indicating that either one of the plurality of default configurations associated with a second one of the indices has been successfully acquired by the wireless communication device, or whether the default configuration associated with the second index is supported by the wireless communication device and receives, responsive to transmitting the first message, a second message indicating the first index. Any number of default configurations, associated with respective indices, which have been successfully acquired or supported by the communication device can be indicated from the communication device to the communication node in the first message. In some embodiments, the wireless communication device receives a third message indicating the first index that is associated with one of the plurality of default configurations.

Figure 10:
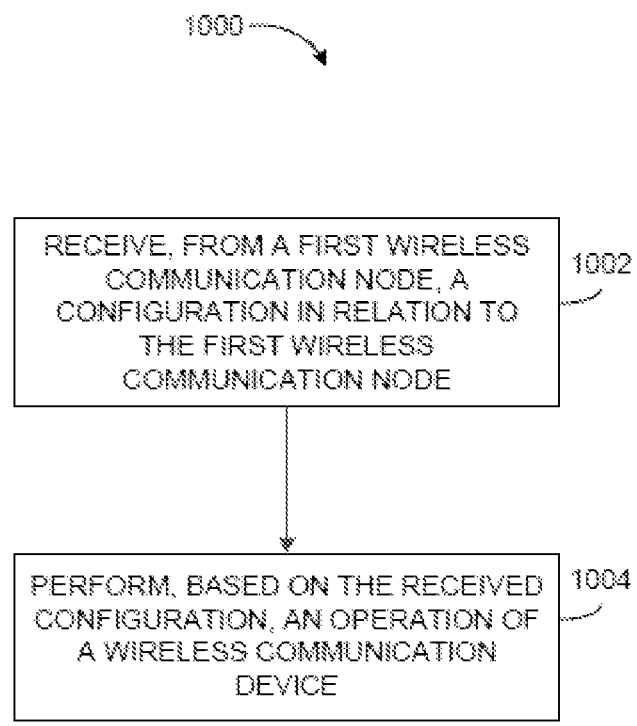
FIG. 10 is a flow diagram illustrating an example process for providing configuration information, in accordance with some embodiments of the present disclosure.

FIG. 10 is a flow diagram illustrating an example process 1000 for providing configuration information, in accordance with some embodiments of the present disclosure. In some embodiments, the process 1000 can be performed by a wireless communication device (e.g. the UE 104, the UE 204, the UE 504, the UE 604 or the UE 704, among others). Additional, fewer, or different operations may be performed in the process 1000 depending on the embodiment. The wireless communication device receives, from a first wireless communication node (e.g. the BS 102, the BS 202, the current satellite 502A, or the GEO satellite 602A, among others), a configuration in relation to the first wireless communication node (1002). The wireless communication device performs, based on the received configuration, an operation of the wireless communication device (1004).

In some embodiments, the configuration includes at least one of: ephemeris information of the first wireless communication node and a second wireless communication node (e.g. the BS 102, the BS 202, the neighbor satellite 502B, or the LEO satellite 602B, among others) neighboring the first wireless communication node; respective physical cell identifiers (PCIs) of cells of the first wireless communication node and respective PCIs of cells of the second wireless communication node; an orbit type of the first wireless communication node and an orbit type of the second wireless communication node; an uplink (UL) power requirement of the first wireless communication node and an UL power requirement of the second wireless communication node; an downlink (DL) power requirement of the first wireless communication node and a DL power requirement of the second wireless communication node; a band number of the first wireless communication node and a band number of the second wireless communication node; an indication specifying whether an autonomous search is required; one or more Non-Public Network (NPN) identifiers, each of which is associated with either a limited access or an allowed access; one or more Closed Access Group (CAG) identifiers, each of which is associated with either a limited access or an allowed access; or one or more Public Land Mobile Network (PLMN) identifiers, each of which is associated with either a limited access or an allowed access.

In some embodiments, the first wireless communication node and the second wireless communication node each includes a non-terrestrial network (NTN) communication node. In some embodiments, the configuration is received from the first wireless communication node via a dedicated radio resource control (RRC) message or system information. In some embodiments, the wireless communication device receives the configuration in either an RRC inactive or an RRC idle state. In some embodiments, the wireless communication device selects or reselects a cell based on the configuration.

In some embodiments, the wireless communication device receives the configuration in an RRC connected state. In some embodiments, the wireless communication device transmits, based on the configuration, a measurement report to the first wireless communication node. In some embodiments, the wireless communication device performs, based on the configuration, a handover to a cell and transmits a message to the first wireless communication node indicating that the handover has been performed.

In some embodiments, the wireless communication device receives the configuration in either an RRC inactive, or an RRC idle state, or an RRC connected state. In some embodiments, the wireless communication device measures at least one of: neighboring cells, frequencies, or measurement objects based on the configuration, and selectively transmits, to the first wireless communication node based on the configuration, a measurement report indicating the measurement results.

Figure 11:
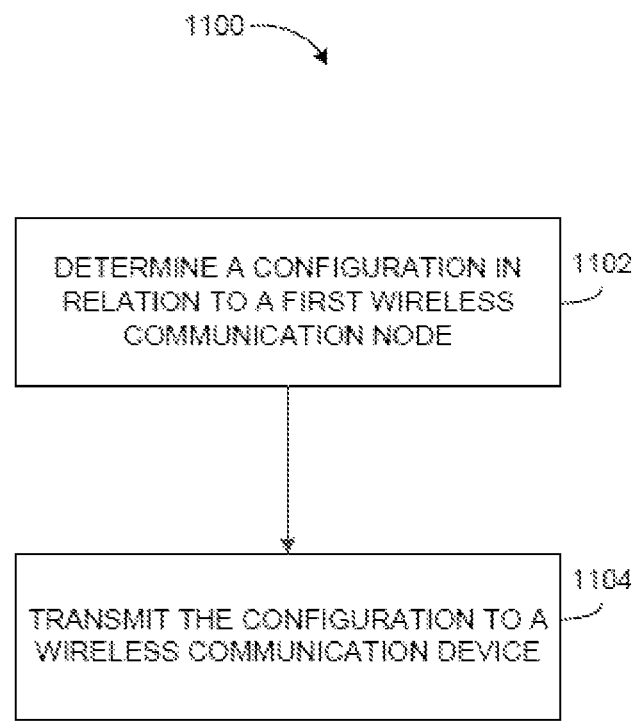
FIG. 11 is a flow diagram illustrating an example process for providing configuration information, in accordance with some embodiments of the present disclosure.

FIG. 11 is a flow diagram illustrating an example process 1100 for providing configuration information, in accordance with some embodiments of the present disclosure. In some embodiments, the process 1100 can be performed by a first wireless communication node (e.g. the BS 102, the BS 202, the current satellite 502A, or the GEO satellite 602A, among others). Additional, fewer, or different operations may be performed in the process 1100 depending on the embodiment. The first wireless communication node determines a configuration in relation to the first wireless communication node (1102). The first wireless communication node transmits the configuration to a wireless communication device (e.g. the UE 104, the UE 204, the UE 504, the UE 604 or the UE 704, among others) (1104).

In some embodiments, the process 800, the process 900, the process 1000, and/or the process 1110 can be performed by a wireless communications apparatus comprising a processor and a memory. In some embodiments, the processor is configured to read code from the memory and implement the process 800, the process 900, the process 1000, and/or the process 1110. In some embodiments, a computer program product comprising a computer-readable program medium code stored thereupon, the code, when executed by a processor, causes the processor to implement the process 800, the process 900, the process 1000, and/or the process 1110.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
configuring, by a first wireless communication node, a list indicating a plurality of default configurations, the plurality of default configurations associated with respective indices;
transmitting, by the first wireless communication node, to a wireless communication device, the list indicating the plurality of default configurations and the respective indices;
transmitting, by the first wireless communication node to a second wireless communication node, responsive to a corresponding message from the wireless communication device indicating whether one of the plurality of default configurations associated with a corresponding index is supported by the wireless communication device, a first message indicating the default configuration associated with the corresponding index, the corresponding message including a UECapability Information message and the first message including a HandoverPreparationInformation message;
receiving, by the first wireless communication node from the second wireless communication node, a second message indicating a first index of the plurality of respective indices, the second message including a Handover Command message; and
providing, by the first wireless communication node to the wireless communication device via an RRCReconfiguration message, the first index of the plurality of the respective indices, the wireless communication device applying a default configuration of the plurality of default configurations, which corresponds to the first index, for operation of the first wireless communication device.

2. The wireless communication method of claim 1, wherein the first index is associated with one of the plurality of default configurations indicated in the list, prior to transmitting the first index to the wireless communication device, the method further comprising:
predefining the list to the wireless communication device.

3. The wireless communication method of claim 2, wherein the list is transmitted to the wireless communication device via a dedicated radio resource control (RRC) message or system information.

4. The wireless communication method of claim 1, wherein the plurality of default configurations include at least one of:
one or more default radio link control (RLC) configurations;
one or more default medium access control (MAC) configurations;
one or more default physical layer (PHY) configurations;
one or more default service data adaptation protocol (SDAP) configurations;
one or more default packet data coverage protocol (PDCP) configurations;
one or more default measurement configurations;
one or more default data radio bearer (DRB) configurations;
one or more default signaling radio bearer (SRB) configurations;
one or more default cell group configurations;
one or more default logical channel configurations;
one or more default configurations for physical channels;
one or more default configurations for reference signal; or
one or more default random access procedure (RACH) configurations.

5. The wireless communication method of claim 4, wherein each of the one or more default RACH configurations includes a plurality of per beam RACH configurations, each of which is associated with one of a plurality of beams, a number of the per beam RACH configurations greater than or equal to a number of the beams.

6. The wireless communication method of claim 1, further comprising:
receiving, by the first wireless communication node from the wireless communication device, a third message indicating that either one of the plurality of default configurations associated with a second one of the indices has been successfully acquired by the wireless communication device, or whether the default configuration associated with the second index is supported by the wireless communication device; and
transmitting, by the first wireless communication node responsive to receiving the third message, a fourth message indicating the first index to the wireless communication device.

7. The wireless communication method of claim 6, wherein the third message includes at least one of: an RRCSetupComplete message, an RRCResumeComplete message, an RRCResetablishmentComplete message, or a UECapabilityInformation message.

8. The wireless communication method of claim 6, wherein the fourth message includes an RRCReconfiguration message.

9. The wireless communication method of claim 1, further comprising:
transmitting, by the first wireless communication node to the wireless communication device, a third message indicating the first index that is associated with one of the plurality of default configurations,
wherein the third message includes an RRCReconfiguration message.

10. The wireless communication method of claim 1, further comprising:
determining, by the first wireless communication node, a detailed configuration; and
transmitting, by the first wireless communication node to the wireless communication device, a fourth message indicating a usage difference between the detailed configuration and one of the plurality of default configurations associated with the first index.

11. The wireless communication method of claim 1, further comprising:
transmitting, by the first wireless communication node to the wireless communication device, a third message indicating the first index and a delta configuration that includes a difference between a detailed configuration and one of the plurality of default configurations associated with the first index,
wherein the third message includes an RRCReconfiguration message.

12. The wireless communication method of claim 1, further comprising:
receiving, by the first wireless communication node from the wireless communication device, the corresponding message indicating whether one of the plurality of default configurations associated with a second one of the indices is supported by the wireless communication device;
transmitting, by the first wireless communication node to a second wireless communication node responsive to receiving the corresponding message, the first message indicating the default configuration associated with the second index.

13. The wireless communication method of claim 1, further comprising:
transmitting, by the first wireless communication node responsive to receiving an third message indicating a handover, the list to a second wireless communication node to cause the second wireless communication node to forward the list to the wireless communication device; and
transmitting, by the first wireless communication node responsive to receiving the third message, the first index to the second wireless communication node to cause the second wireless communication node to forward the first index to the wireless communication device via a fourth message.

14. The wireless communication method of claim 13, wherein the third message includes a HandoverPreparationInformation message and the fourth message includes an RRCReconfiguration message.

15. The wireless communication method of claim 1, further comprising:
transmitting, by the first wireless communication node to the wireless communication device, a third message indicating one or more measurement objects that are linked to one or more neighboring cells or frequencies provided in system information,
wherein the third message includes an RRCReconfiguration message.

16. A wireless communication method, comprising:
receiving, by a wireless communication device from a first wireless communication node, a list indicating a plurality of default configurations, each default configuration associated with a respective index of a plurality of indices;
receiving, by the wireless communication device via an RRCReconfiguration message from the first wireless communication node, a first index of the plurality of indices, wherein the wireless communication device receives the first index from the first wireless communication node responsive to the first wireless communication node receiving a second message, comprising a Handover Command message, from a second wireless communication node indicating the first index of the plurality of indices, the second wireless communication node transmitting the second message responsive to a first message, comprising a HandoverPreparationInformation message, received from the first wireless communication node indicating a default configuration associated with a corresponding index, which the wireless communication device indicated, to the first wireless communication node, whether the default configuration is supported by the wireless communication device; and
configuring, based on the first index, an operation of the wireless communication device according to a default configuration of the plurality of default configuration which is associated with the first index.

17. The wireless communication method of claim 16, wherein the first index is associated with one of the plurality of default configurations indicated in the list, prior to receiving the first index from the wireless communication node, the method further comprising:
predefining the list to the wireless communication device.

18. The wireless communication method of claim 17, wherein the list is received by the wireless communication device via a dedicated radio resource control (RRC) message or system information.

19. A wireless communication node, comprising:
at least one processor configured to:
configure a list indicating a plurality of default configurations, the plurality of default configurations associated with respective indices;

transmit to a wireless communication device, the list indicating the plurality of default configurations and the respective indices;

transmit, to a second wireless communication node, responsive to a corresponding message from the wireless communication device indicating whether one of the plurality of default configurations associated with a corresponding index is supported by the wireless communication device, a first message indicating the default configuration associated with the corresponding index, the corresponding message including a UECapability Information message and the first message including a HandoverPreparationInformation message;

receive, from the second wireless communication node, a second message indicating a first index of the plurality of respective indices, the second message including a Handover Command message; and provide, to the wireless communication device via an RRCReconfiguration message, a first index of the plurality of the respective indices, the wireless communication device applying a default configuration of the plurality of default configurations, which corresponds to the first index, for operation of the first wireless communication device.

* * * * *